United States Patent [19]

Bauer

[11] Patent Number: 4,900,156
[45] Date of Patent: Feb. 13, 1990

[54] TWIN SCREW EXTRUDER WITH THREAD-FREE MIXING ZONES

[75] Inventor: Fritz Bauer, Vaihingen, Fed. Rep. of Germany

[73] Assignee: Werner & Pfleiderer GmbH, Stuttgart, Fed. Rep. of Germany

[21] Appl. No.: 259,881

[22] Filed: Oct. 19, 1988

[30] Foreign Application Priority Data

Nov. 14, 1987 [DE] Fed. Rep. of Germany ....... 3738700

[51] Int. Cl.⁴ .............................................. B29B 7/48
[52] U.S. Cl. ...................................... 366/85; 366/90; 366/322; 425/204; 425/207; 425/209
[58] Field of Search ............... 425/207, 208, 209, 205, 425/204; 366/85, 89, 90, 301, 322, 323, 324; 222/412, 413

[56] References Cited

U.S. PATENT DOCUMENTS

| | | | |
|---|---|---|---|
| 3,425,640 | 2/1969 | Kletschke et al. | 222/413 |
| 4,666,649 | 5/1987 | Takubo et al. | 264/176.1 |
| 4,744,669 | 5/1988 | Kowalczyk et al. | 366/77 |

FOREIGN PATENT DOCUMENTS

| | | |
|---|---|---|
| 815641 | 7/1949 | Fed. Rep. of Germany . |
| 1911307 | 3/1969 | Fed. Rep. of Germany ...... 425/208 |
| 716835 | 2/1980 | U.S.S.R. .............................. 425/208 |

*Primary Examiner*—Jay H. Woo
*Assistant Examiner*—K. P. Nguyen
*Attorney, Agent, or Firm*—Roberts, Spiecens & Cohen

[57] ABSTRACT

Apparatus for mixing material in a twin screw extruder by longitudinally advancing material by the interengaging threads of two screws in the housing of a twin screw extruder such that a plurality of separate streams of material are advanced by the threads of the screws, combining the separate streams of material in a thread-free zone of the screws in which the passage area for the streams of material undergoes uniform reduction and lateral displacement around one of the screws, and thereafter dividing the combined stream back into separate streams downstream of the thread-free zone. In the thread-free zone, a baffle element is mounted on the shaft of one of the screws, the baffle element being of conical shape and increasing uniformly in diameter in the direction of advance of the product. The smaller end of the baffle element has a diameter which is substantially equal to the inner diameter of the threads of the associated screw and the larger end has a diameter which is substantially equal to the outer diameter of the threads of the screw. The shaft of the other screw supports a cylindrical sleeve in the thread-free zone.

9 Claims, 1 Drawing Sheet

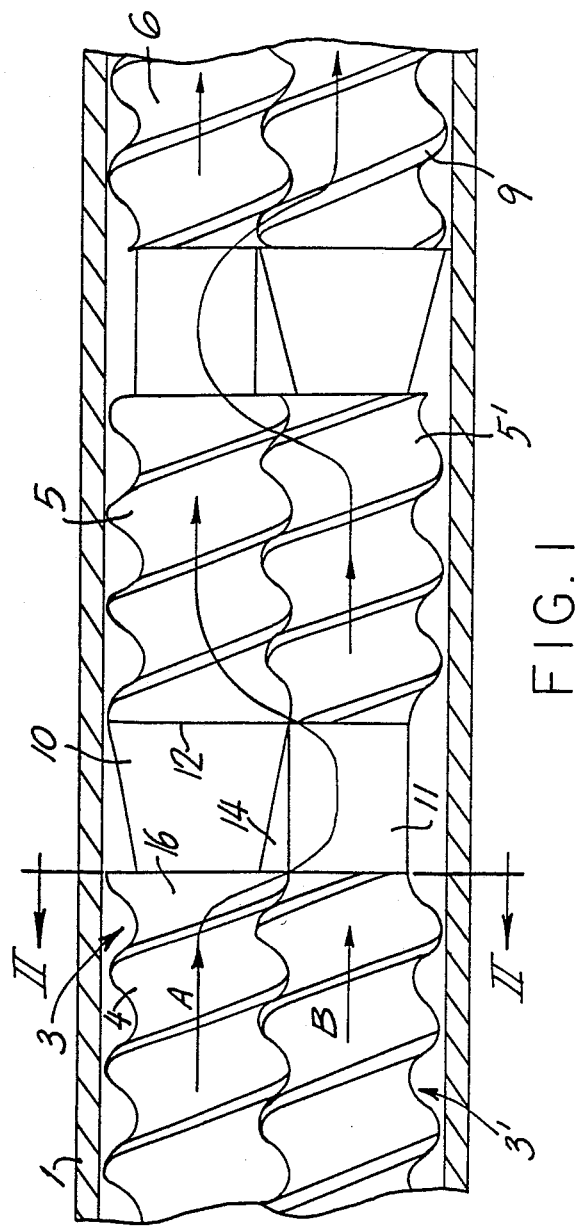
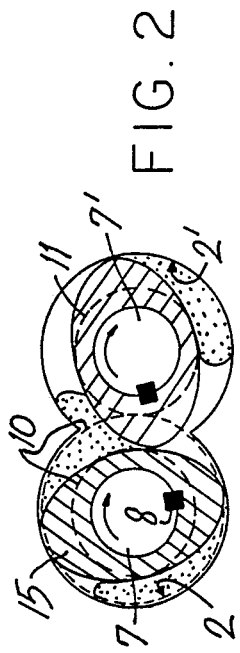
FIG. 1
FIG. 2

TWIN SCREW EXTRUDER WITH THREAD-FREE MIXING ZONES

FIELD OF THE INVENTION

The present invention relates to a twin screw extruder having two extruder screws rotating in the same direction around parallel axes of rotation, the screws having screw sections with interengaging threads for longitudinally advancing a product.

More particularly, the present invention relates to such a twin screw extruder in which the screws are devoid of threads in a zone between screw sections and a baffle element is secured on one of the screws between the screw sections for effecting a mixing of the material.

DESCRIPTION OF PRIOR ART

In order to carry out different processing operations, it is known to form the screws of a twin screw extruder with different screw sections which consist, in particular, of a succession of screw and kneading elements. Such processing operations are, for example, mixing, melting and homogenizing plastic materials upon the addition of additive and filler elements, by developing shearing forces while maintaining a given temperature profile dependent on the material being processed.

By providing screw elements of different pitch, the efficiency of the conveyance and the pressure built-up in the extruder are particularly influenced and a desired development of shearing forces to obtain an optimum mixing action is made possible.

In DE-PS 815,641, it is known to improve the mixing action in the extruder by arranging baffle plates on alternate sides on the screw shafts, so that the material being processed is forced to pass in continuous exchange from one screw shaft to the other. An improvement in the mixing action is thereby obtained by repeated deflecting and combining of the streams of material in the screw channels, the baffle elements producing a considerable increase in pressure and shear within the material being processed. This is disadvantageous in the case of plastic materials which are sensitive to pressure and temperature and for the incorporation of additive elements which require a homogeneous distribution within the material being processed, with low stress.

Adherence of residues of product to the baffle element limits the flow of material and is also disadvantageous.

SUMMARY OF THE INVENTION

An object of the present invention is to provide a twin screw extruder which permits homogenization by deflection of the flow of the material being processed, with only slight shearing stress, particularly for incorporating additive elements.

This object is achieved according to the invention by providing a baffle element of conical shape which increases uniformly in diameter in the direction of advance of the product.

In further accordance with the invention, the smaller diameter of the baffle element is substantially equal to the inner diameter of the screw section and the larger diameter of the baffle element is equal to the outer diameter of the screw section.

It has been found, surprisingly, that upon a rearranging of the streams of material, the shearing stress can be reduced to a minimum if the streams of material which flow out of the screw channels of one screw shaft are not only rearranged to form one stream of material but this stream of material is distributed in the longitudinal direction of the processing path during the course of the positive rearrangement. The combined streams of material first of all flow, with continuous uniform change in direction within the thread-free zone arranged behind the screw channels, to the baffle which limits the streams of material, so that a positive deflection takes place with only a very slight build-up of pressure in the material being processed. In this way it is possible to obtain both a gentle homogenizing of the material itself which is being processed as well as a gently incorporation of additives without subjecting them to increased shearing stress. The fiber length of given filler materials is not essentially reduced and the percentage of fines of such filler materials remains limited to a minimum. By the gradual change in direction of the stream of material flowing from the screw shaft, harmful accumulations of product are furthermore avoided.

In further accordance with the invention, the baffle element has a length between 3.5 and 1.3 times the outer diameter of the threads in order to assure effective treatment of the product in said thread-free zone.

In further accordance with the invention, a plurality of thread-free zones are arranged along the screw shafts to effect a further improvement of the mixing action.

In still further accordance with the invention, the baffle element is constructed to be pushed on the associated shaft and fixed for rotation therewith so that replacement of individual baffle elements can be effected simply.

In the twin screw extruder the interengaging threads of the two screws in the housing of the twin screw extruder longitudinally advance the material in a plurality of separate streams and these separate streams of material are combined in a thread-free zone of the screws in which the passage area for the streams of material undergoes uniform reduction and lateral displacement for confinement around one of the screws whereafter the combined stream is divided back into separate streams downstream of the thread-free zone.

BRIEF DESCRIPTION OF THE FIGURES OF THE DRAWING

FIG. 1 is a diagrammatic, longitudinal sectional view through a portion of a twin-screw extruder according to the invention.

FIG. 2 is a sectional view taken on line II—II in FIG. 1 and turned counter-clockwise 90°.

DETAILED DESCRIPTION OF A PREFERRED EMBODIMENT

FIG. 1 shows a twin-screw extruder having a housing 1 provided with overlapping parallel, longitudinal bores 2, 2' in which extruder screws 3, 3' are respectively arranged for rotation in the same direction around parallel, longitudinal axes.

The extruder screws 3, 3' include respective axially spaced screw sections 4, 5, 6 and 4', 5', 6' mounted on respective shafts 7, 7'. The screw sections are secured for rotation with the respective shafts by means of keys 8 fitted in keyways in the screw sections and the shafts.

The threads 9 of the screw sections have inner and outer diameters respectively at the roots and peripheries thereof and the threads on one screw interengage the threads on the other screw to scrape the material off the screws while mixing and advancing the material longitudinally of the screws. The pitch of the threads of the screw sections can vary along the screws as a function of the processing operation.

Between successive screw sections, i.e. between sections 4 and 5 and 5 and 6, a thread-free zone is formed and referring to the zone between sections 4 and 5 and 4' and 5', therein is mounted on screw 3 a conically-shaped baffle element 10 and on screw 3' mounted on cylindrical sleeve 11. The baffle element 10 and sleeve 11 are of the same length and extend between successive screw sections.

The baffle element 10 and the sleeve 11 are preferably constructed as bushings 15 which can be pushed onto the corresponding screw shafts 7 and 7' respectively. The length of the baffle element 10 and the length of the sleeve 11 correspond preferably to about one-half the outer diameter of the threads of a screw section. The outer surface of the conically-shaped baffle element 10 widens uniformly in the direction of advance of the product, shown by the arrows A and B. The end 12 of baffle 10 of greatest diameter passes with very slight radial clearance the inner (root) diameter of the screw section 5' and thus confronts with slight clearance the sleeve 11 whose outside diameter corresponds to the inner diameter of the threads of screw sections 5 and 5'. The thread 9 of the screw section 5' terminates slightly away from the end surface of screw section 5'.

The stream of product advancing in the direction of arrow A is forced to flow from the screw channels 16 in the screw section 4 into the thread-free zone around sleve 11. As seen in FIG. 2, this results in combining a total of three streams of product along the sleeve 11 into a single product stream which is then divided again into three product streams in the following screw sections 5 and 5'.

As a result of the conical outer shape of the baffle element 10, there is obtained a comparatively slow transfer and combining of the streams of product with uniform change in direction.

Since a free space 14 is formed between the cylindrical sleeve 11 and the baffle element 10, the material being processed is subjected only to slight compressive and shearing forces, so that even sensitive products can be well homogenized. Since there is no impact of the streams of product against one another, no deleterious caking of product occurs.

In order to increase the mixing action, the means which are arranged in each zone in pairs, i.e., the baffle element 10 formed as a conical bushing and the sleeve 11 formed as a cylindrical bushing can be arranged as shown in FIG. 1 in spaced arrangement on the screw shafts 7, 7', preferably, in alternating relation.

Due to the gentle deflection of the streams of product, both a homogeneous distribution of temperature in the material being mixed, as well as a homogeneous distribution of the mixture components is obtained with low shearing stress. Upon the admixing of long-fiber reinforcing substances such as, for instance, glass fibers, the fiber length is not substantially decreased during the processing in the twin screw extruder and the percentage of fines thereof is limited to a minimum.

The twin screw extruder as constructed according to the invention carries out a unique method in which material is longitudinally advanced by the interengaging threads of the two screws in the form of a plurality of separate streams of material as shown in FIG. 2. In the thread-free zone of the screws, the separate streams of material are combined and the combination takes place in the uniformly reducing passage area 14 between the conical baffle element 10 and the sleeve 11, such that the combined stream has been laterally displaced around sleeve 11 wherefrom the material is thereafter divided from the combined stream back into the separate streams downstream of the thread-free zone. As shown in FIG. 1, the successive combining and dividing of the material takes place in alternation between the screws by placing the conical baffle elements 10 and the sleeves 11 in alternation on the different screws.

Although the invention has been described in relation to a specific embodiment thereof, it will become apparent to those skilled in the art that numerous modifications and variations can be made within the scope and spirit of the invention as defined in the attached claims.

What is claimed is:

1. A twin screw extruder comprising a housing, two extruder screws supported in said housing for rotation in the same direction about parallel, longitudinal axes of rotation, each of said screws including a shaft and a screw section having threads secured on the associated shaft for rotation therewith, the threads of the screw section of one shaft interengaging with the threads of the screw section of the other shaft to advance a product longitudinally along the screws, the threads of said screw section having inner and outer diameters, said screws including adjoining sections devoid of said screw sections to define a zone free of threads, one of said shafts including a cylindrical section in said zone free of threads and a baffle element on the other of said shafts in the zone free of threads, said baffle element being of conical shape which increases uniformly in diameter in the direction of advance of the product, said baffle element having one end of smaller diameter which is substantially equal to the inner diameter of the threads of said screw section and a seciond end of larger diameter which is substantially equal to the outer diameter of the threads of said screw section.

2. A twin screw extruder as claimed in claim 1 wherein said baffle element has a length between 0.5 and 1 times the outer diameter of the threads of said screw section.

3. A twin screw extruder as claimed in claim 1 wherein a plurality of zones which are free of threads are arranged in longitudinally spaced relation along said screws.

4. A twin screw extruder as claimed in claim 1 wherein said baffle element comprises a bushing which is pushed on said shaft and secured thereto for rotation with said shaft.

5. A twin screw extruder as claimed in claim 1 wherein said baffle element has a length between 0.5 and 1 times the outer diameter of the threads of said screw section, a plurality of thread-free zones being arranged in longitudinally spaced relation along said screws.

6. A twin screw extruder as claimed in claim 5 wherein baffle elements are mounted on both shafts in alternation in said zones.

7. A twin screw extruder as claimed in claim 1 wherein said cylindrical section has an outer diameter equal to the inner diameter of said threads on the screw section.

8. A twin screw extruder as claimed in claim 7 wherein a plurality of thread-free zones are arranged in longitudinally spaced relation along said screws between successively spaced screw sections on said shafts, each thread-free zone containing one said baffle element on a first of said screws and one said cylindrical section on the second of said screws, the baffle element and cylindrical section each extending on the respective screw between successive screw section.

9. A twin screw extruder as claimed in claim 8 wherein said baffle elements and said cylindrical sections are mounted in alternation on said screws in said thread-free zones.

* * * * *